(12) United States Patent
Kasono et al.

(10) Patent No.: US 6,194,129 B1
(45) Date of Patent: Feb. 27, 2001

(54) METHOD OF MANUFACTURING A MASTER OPTICAL DISK

(75) Inventors: Osamu Kasono; Hiroki Kuribayashi; Takanobu Higuchi, all of Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/173,164

(22) Filed: Oct. 15, 1998

(30) Foreign Application Priority Data

Oct. 15, 1997 (JP) ................................... 9-282063

(51) Int. Cl.⁷ ........................................................ G11B 7/26
(52) U.S. Cl. ...................... 430/320; 430/321; 430/945; 430/273.1; 430/271.1; 369/112; 359/508; 359/664
(58) Field of Search .......................... 430/281.1, 273.1, 430/945, 320, 321; 359/508, 664; 369/112

(56) References Cited

U.S. PATENT DOCUMENTS

| | | | |
|---|---|---|---|
| 3,767,398 | * 10/1973 | Morgan | 430/271.1 |
| 4,150,398 | * 4/1979 | Kojima et al. | 430/945 |
| 4,200,463 | * 4/1980 | Flowers | 430/317 |
| 4,806,450 | * 2/1989 | Hofmann et al. | 430/281.1 |
| 4,842,987 | * 6/1989 | Elzer et al. | 430/281.1 |
| 5,061,602 | * 10/1991 | Koch et al. | 430/281.1 |
| 5,121,256 | * 6/1992 | Corle et al. | 359/664 |
| 5,576,148 | * 11/1996 | Imai et al. | 430/314 |
| 5,993,694 | * 11/1999 | Ito et al. | 252/500 |

FOREIGN PATENT DOCUMENTS 54-114977 * 11/1985 (JP).

* cited by examiner

*Primary Examiner*—Martin Angebranndt
(74) *Attorney, Agent, or Firm*—Sughrue, Mion, Zinn, Macpeak & Seas, PLLC

(57) ABSTRACT

In a method of manufacturing a master optical disk, a photoresist applied to an optical disk substrate is coated with an optical film for converging recording light on the optical disk substrate in cooperation with a solid immersion lens body. The photoresist is exposed through the optical film by using an optical system including the solid immersion lens.

4 Claims, 7 Drawing Sheets

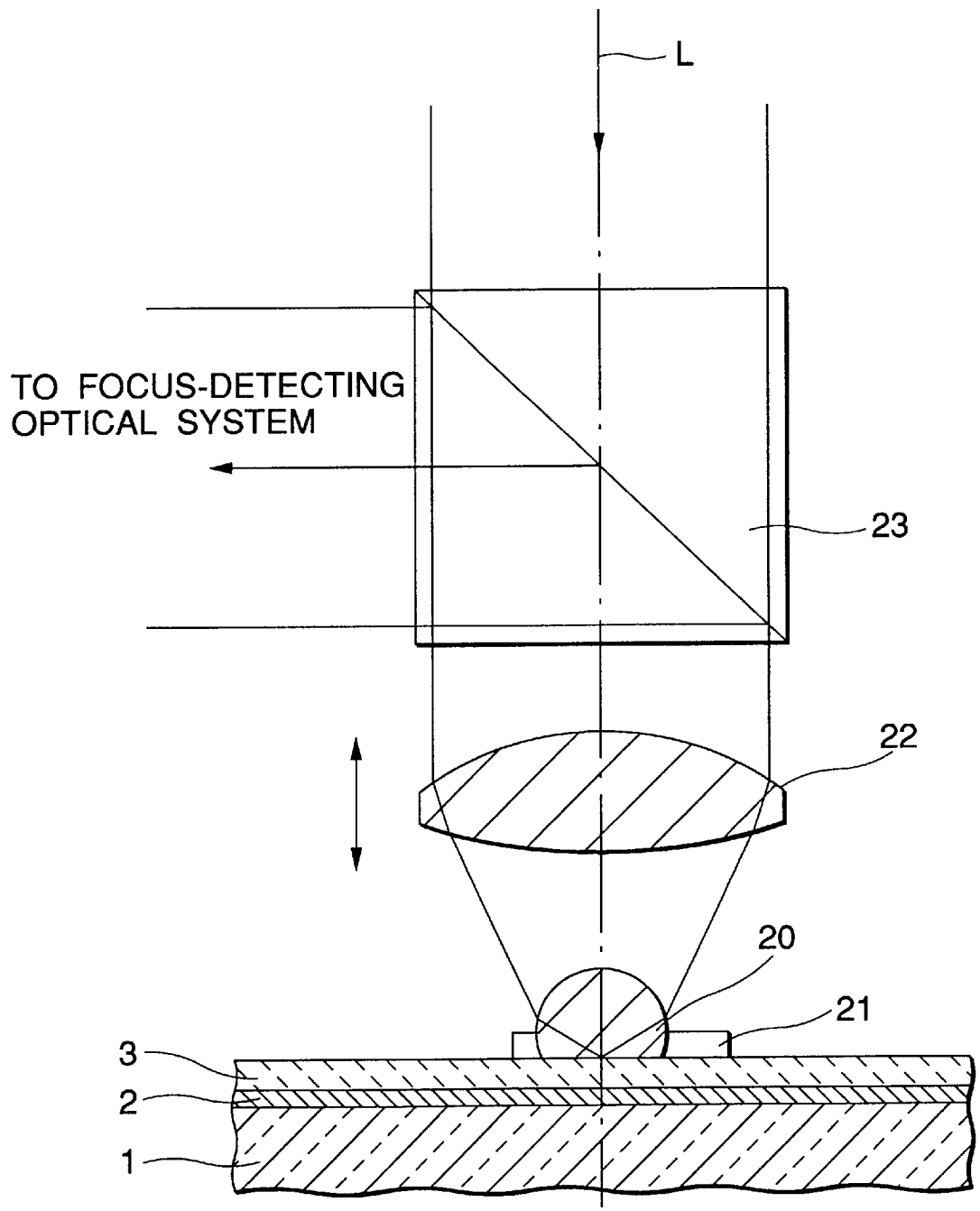

METHOD OF MANUFACTURING A MASTER OPTICAL DISK

BACKGROUND OF THE INVENTION

1. Field of the Invention

The present invention relates to a method of manufacturing a master optical disk, and more particularly to a method of manufacturing a master optical disk wherein high-density cutting is effected by using a solid immersion lens (SIL)

2. Description of the Related Art

Conventionally, a technique is known in which information is recorded on an optical disk by using a solid immersion lens (hereafter, referred to as the SIL).

Here, referring to FIGS. 6A to 6C, a description will be given of the essential steps of the process for manufacturing a master optical disk.

(1) Step of Coating with a Photoresist (see FIG. 6A)

After a glass substrate 50 worked into a predetermined shape is coated with an organic primer such as hexamethyldisilazane (HMDS) so as to enhance adhesion to a photosensitive material (photoresist), the glass substrate 50 is spin-coated with a photoresist 51, as shown in FIG. 6A.

Then, a solvent in the photoresist 51 is allowed to evaporate, and the glass substrate 50 with the photoresist 51 coated thereon is prebaked by using a clean oven or the like so as to stabilize the film of the photoresist 51.

(2) Exposure Step (see FIG. 6B)

A recording signal is supplied to a recording head of a cutting apparatus (not shown) from a external circuit (not shown), recording light is turned on and off by an optical modulator (not shown), and recording light L is introduced to an objective lens 52, as shown in FIG. 7.

At this time, the recording light L which is converged by the objective lens is made incident upon the spherical surface of an SIL 53, and the recording light L is converged substantially on the center of a flat surface, i.e., an emergent surface, of the SIL 53.

In this case, if it is assumed that a super spherical lens is used as the SIL 53, an equivalent numerical aperture NA of the optical system using the SIL becomes $$NA = n^2 \times NA$$

where n is the refractive index of the SIL.

Accordingly, if the wavelength of the laser light is assumed to be $\lambda$, the beam spot diameter $L_{BEAM}$ of the recording light is determined by $$L_{BEAM} = \lambda/(n^2 \times NA)$$

More specifically, the recording light L converged by the objective lens 52 is made incident upon the SIL 53 disposed spaced apart by a gap (see FIG. 7) from the surface of the photoresist 51, is converged by the SIL 53, and is applied to the photoresist 51 on the glass substrate 50, thereby cutting (recording) information spirally.

At this time, the beam diameter at the emergent surface of the SIL 53 becomes $\phi D1$ as shown in the detailed explanatory diagram of FIG. 8, and becomes substantially equal to the beam diameter on the photoresist 51 if the gap is set to effect near-field recording, i.e., if the gap is set to a distance less than the ¼ wavelength of the recording light.

(3) Development Step (see FIG. 6C)

Next, as development process is effected, a master glass disk is formed in which recess-shaped pits are arranged spirally on its surface.

In the case where the above-described conventional cutting apparatus is used, since the SIL 53 effects near-field recording with respect to the photoresist 51 on the glass substrate 50, the recording light L is converged (with a diameter of $\phi D1$) inside the SIL 53. Hence, there has been a problem in that the power density in the vicinity of the emergent surface of the SIL 53 becomes high, resulting in the deterioration (so-called tarnish) of the SIL such as clouding.

In addition, dust which is present in the air even in a clean room is generally larger than the gap interval (10 [nm] to 100 [nm]) of the SIL. Hence, there has been a problem in that as the dust enters the gap portion due to static electricity and the like, the floating head is sprung up, making accurate writing impossible until the interval between the SIL and a protective film is restored to its original interval.

In addition, there has been another problem in that dust becomes attached to the substrate of the optical disk due to static electricity, and the SIL, the protective film, or the photoresist is defected by the attached dust.

SUMMARY OF THE INVENTION

It is therefore an object of the invention to provide a method of manufacturing a master optical disk which is capable of manufacturing a master optical disk which prevents the deterioration of the SIL and allows high-density recording to be effected.

To attain the above-described objects, according to a first aspect of the invention, there is provided a method of manufacturing a master optical disk by using an optical system having a solid immersion lens body so as to converge recording light on an optical disk substrate for cutting thereof. The method includes the steps of: coating an optical film on a photoresist applied to the optical disk substrate; exposing the photoresist through the optical film by using the optical system; and removing the optical film.

In accordance with the first aspect of the invention, in the optical-film coating step, the photoresist applied to the optical disk substrate is coated with the optical film for converging the recording light on the optical disk substrate in cooperation with the solid immersion lens body.

In the exposure step, the photoresist is exposed through the optical film by using the optical system in a state in which the solid immersion lens body is held by the floating head.

In the optical-film removing step, the optical film is removed.

According to a second aspect of the invention, in the first aspect of the invention, the photoresist is non-soluble to water, and the optical film is water soluble, and the optical-film removing step includes a washing step for washing the optical disk substrate having the photoresist and the optical film coated thereon with water.

In accordance with the second aspect of the invention, in addition to the effect derived from the first aspect of the invention, since the optical film is water soluble, in the washing step in the optical-film removing step, the optical disk substrate having the photoresist and the optical film coated thereon is washed.

According to a third aspect of the invention, in the first aspect of the invention, the optical film is formed of an electrically conductive material.

In accordance with the third aspect of the invention, in addition to the effect derived from the first aspect of the invention, since the optical film is formed of an electrically conductive material, it becomes difficult for dust to attach to the optical film due to static electricity.

According to a forth aspect of the invention, in the first aspect of the invention, the optical film includes an electrically conductive material.

In accordance with the forth aspect of invention, in addition to the effect derived from the first aspect of the invention, since the optical film includes an electrically conductive material, it becomes difficult for dust to attach to the optical film due to static electricity.

According to a fifth aspect of the invention, in the first aspect of the invention, the optical film includes an antistatic agent.

In accordance with the fifth aspect of the invention, in addition to the effect derived from the first aspect of the invention, since the optical film includes an antistatic agent, it becomes difficult for dust to attach to the optical film due to static electricity.

BRIEF DESCRIPTION OF THE DRAWINGS

Similar reference characters denote corresponding features consistently throughout the attached drawings. The preferred embodiments of this invention will be described in detail, with reference to the following figures, wherein:

FIG. 3 is an explanatory diagram of a recording head;

DETAILED DESCRIPTION OF THE PREFERRED EMBODIMENTS

Figure 1A:
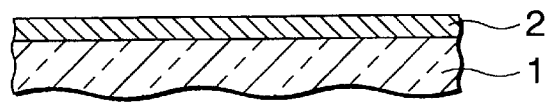
FIGS. 1A to 1E are process diagrams explaining essential steps of a process for manufacturing a master optical disk in accordance with an embodiment of the invention.

Referring now to the drawings, a description will be given a preferred embodiment of the present invention.

FIGS. 1A to 1E illustrate process diagrams explaining essential steps of the process for manufacturing a master optical disk.

(1) Step of working, grinding/polishing, and cleaning a glass substrate (1-1) Working The process of manufacturing a master optical disk begins with the working of a glass substrate 1 serving as a substrate of the optical disk.

As the material of the glass substrate 1, it is conceivable to use optical glass, reinforced glass, or the like in the light of optical properties, physical properties (particularly the strength), and the like, but soda-lime glass is generally used in the light of the cost.

After the glass substrate 1 is worked into a predetermined shape of a disk, checks are made on the following items:

1) dimensions of the inside and outside diameters,
2) thickness,
3) roundness and concentricity,
4) flatness and parallelism, and
5) surfaces defects including bubbles, flaws, breakage, and the like (1-2) Grinding/Polishing The glass substrate 1 passed the aforementioned checks is subjected to grinding/polishing for the purposes of:

1) removal of fine flaws on the surface, and
2) activation of the surface (1-3) Cleaning Next, in order to remove abrasive grains, glass powder, and the like attached due to grinding/polishing, the glass substrate 1 is subjected to scrubber cleaning by using ultrapure water, and is spin-dried by using ultrapure water.

(2) Step of Coating with a Photoresist (see FIG. 1A)

The glass substrate 1 is coated with an organic primer such as hexamethyldisilazane (HMDS) so as to enhance adhesion between the glass substrate 1 and a photoresist (photosensitive material) 2, and the photoresist 2 is spin-coated thereon.

Then, a solvent in the photoresist 2 is allowed to evaporate, and the glass substrate 1 with the photoresist 2 coated thereon is prebaked by using a clean oven or the like so as to stabilize the film of the photoresist 2.

Incidentally, the film thickness of the photoresist 2 has a direct relation to the height and shape of the pits of the optical disk and substantially affects the reproduction quality, so that control of the film thickness of the photoresist 2 is important.

Accordingly, the film thickness of the photoresist 2 is measured with high sensitivity and in a noncontact and nondestructive state by using ellipsometry, and inspection is made as to whether or not the film thickness is within a predetermined range.

Figure 1B:
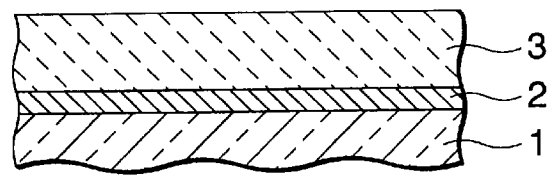

(3) Step of Coating with an Optical Film (see FIG. 1B)

Next, the laminate is coated with an optical film 3 for preventing the deterioration due to the concentration of energy in the SIL.

In this case, the following six characteristics are required as the characteristics of the optical film 3:

1) The formation and exfoliation of the film are easy.
2) The optical film 3 does not become mixed with the photoresist 2 during the film formation.
3) The optical film 3 has a sufficient transmittance so as not to hamper the exposure of the photoresist 2.
4) The optical film 3 has a high refractive index.
5) The film can be formed with a sufficient thickness for practical use.
6) The optical film 3 is electrically conductive or has an antistatic effect so as to suppress the generation of static electricity which causes attraction of dust and the like.

As the material of a protective film having the aforementioned characteristics, it is possible to cite a conductive aqueous polymer, an aqueous polymer with a small amount of antistatic agent added thereto, or the like. As the characteristics of the aqueous polymer, it is possible to cite the following:

1) The aqueous polymer permits spin coating to facilitate film formation, and can be exfoliated with water.
2) Since the photoresist 2 is non-soluble to water, the aqueous polymer does not mix with the photoresist 2.
3) The aqueous polymer is an optically transparent compound.

More specifically, it is possible to cite polyaniline sulfonic acid which is a conductive polymer, a copolymer or a mixture of polyaniline sulfonic acid and a nonconductive aqueous polymer (e.g., polyvinyl alcohol, polyvinyl pyrrolidone, polyvinyl isobutyl ether, or cellulose ether), or the like.

In addition, it is possible to cite a mixture in which a very small amount of antistatic agent is added to the aforementioned aqueous polymer to such an extent that the transmittance of the deterioration-preventing layer will not decline substantially. Specifically, the antistatic agent may be selected from N,N-bis(2-hydroxyethyl)alkylamine, polyoxyethylene alkylamine, polyoxyethylene alkylamine fatty ester, polyoxyethylene sorbitan fatty ester, polyoxyethylene fatty alcohol ether, polyoxyethylene alkyl phenyl ether, polyethylene glycol fatty ester, alkyl sulfonate, alkylbenzene sulfonate, alkyl sulfate, alkyl phosphate, tetraalkyl ammonium salt, trialkyl benzyl ammonium salt, alkyl pentane, and imidazolin.

In the case where the antistatic agent is added, the aqueous polymer may not necessarily be electrically conductive, i.e., the aqueous polymer may be a simple substance of a nonconductive aqueous polymer, e.g., polyvinyl alcohol, polyvinyl pyrrolidone, polyvinyl isobutyl ether, or cellulose ether, or a copolymer or a mixture thereof.

In addition, instead of the aforementioned antistatic agent, it is possible to add a very small amount of an electrically conductive material such as graphite, carbon fibers, carbon black, mica, metal fibers, metal powder, or metal ions to such an extent that the transmittance of the optical film does not decline substantially in practical use.

By using as the optical film an aqueous polymer which is electrically conductive or has an antistatic effect, it is possible to prevent the generation of static electricity and prevent the solid immersion lens body from impinging upon the optical film due to electrical attraction caused by static electricity. At the same time, it is possible to maintain an amount of floating of the solid immersion lens body to a predetermined level, and reduce the attraction of dust floating in the air, whereby making it possible to prevent the solid immersion lens body from impinging upon the dust.

As a result of using such a material, it is possible to form a protective film with a refractive index of 1.5 or thereabouts and a thickness of 0.1 $\mu$m to several $\mu$m.

Figure 1C:
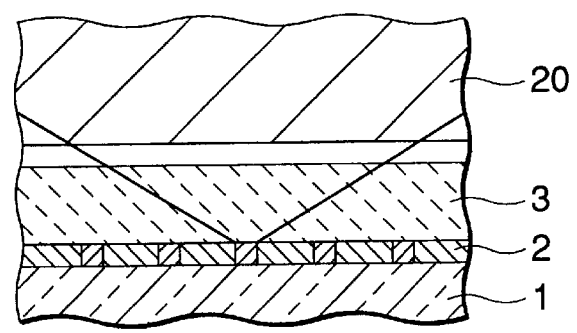

(4) Exposure Step (see FIG. 1C)

Figure 2:
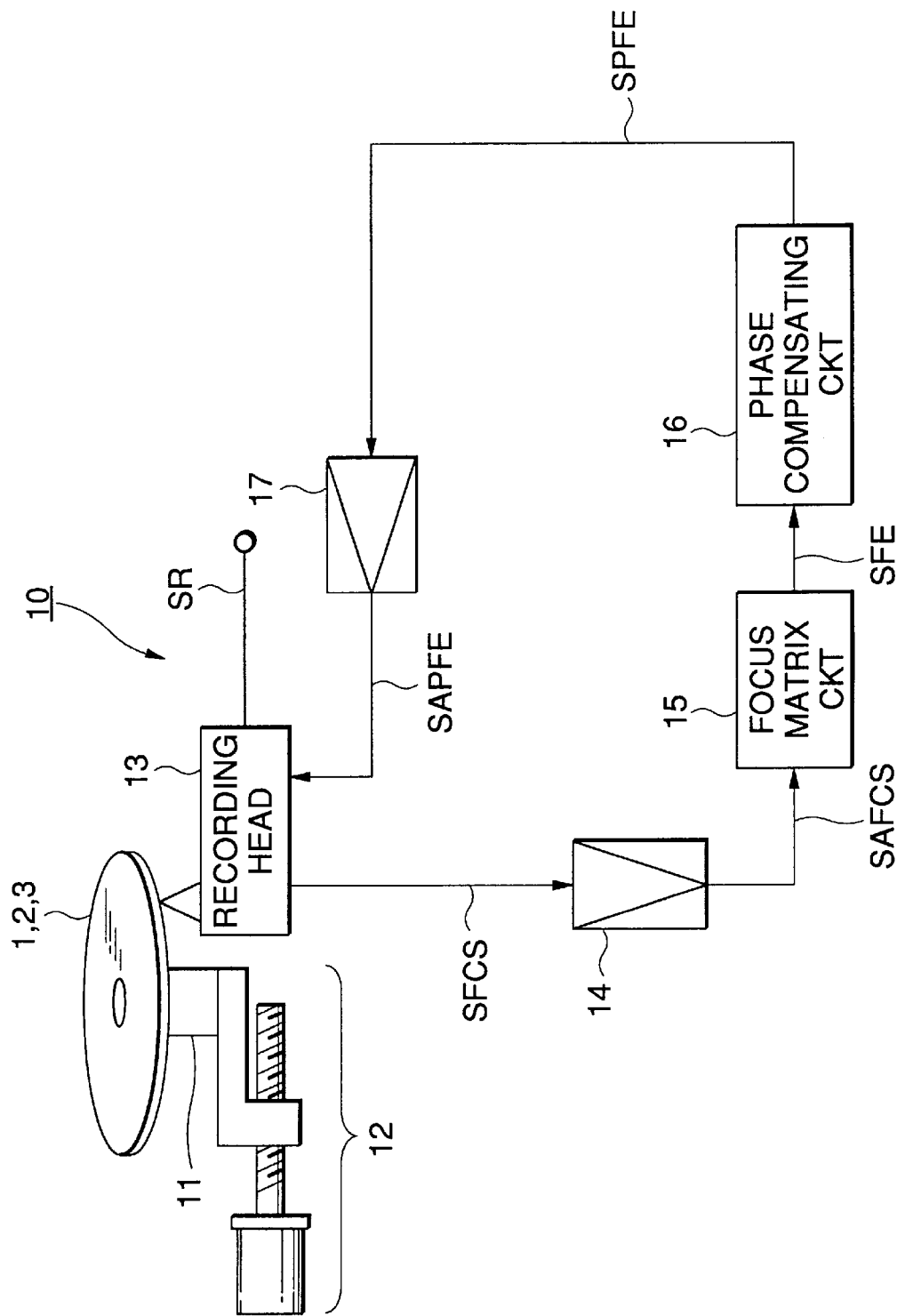
FIG. 2 is a block diagram illustrating a schematic configuration of a cutting apparatus.

Next, before describing the exposure step, a description will be given of a cutting apparatus with reference to FIG. 2.

A cutting apparatus 10 is constructed by a drive motor 11 for rotatively driving the glass substrate 1 with the photoresist 2 and the optical film 3 coated thereon; a disk feeding device 12 for driving the drive motor 11 in the radial direction of the glass substrate 1; a recording head 13 to which a recording signal $S_R$ is supplied from an external device (not shown), and an amplified phase-compensated focus error signal $S_{APFE}$ is supplied from an amplifier 17 which will be described later, and which outputs a focus servo signal $S_{FCS}$; a head amplifier 14 which amplifies the focus servo signal $S_{FCS}$ and outputs the amplified signal as an amplified focus servo signal $S_{AFCS}$; a focus matrix circuit 15 for generating and outputting a focus error signal $S_{FE}$ on the basis of the amplified focus servo signal $S_{AFCS}$; a phase compensating circuit 16 for phase-compensating the focus error signal $S_{FE}$ and outputting a phase-compensated focus error signal SPFE; and the amplifier 17 for amplifying the phase-compensated focus error signal $S_{PFE}$ and outputting the amplified phase-compensated focus error signal $S_{APFE}$.

FIG. 3 shows a schematic diagram of essential portions of the recording head.

The recording head 13 is constructed by an SIL 20 for further converging the recording light converged by an objective lens 22, which will be described later, by cooperating with the optical film 3 so as to improve the effective numerical aperture; a floating head 21 for causing the SIL 20 to float by being spaced apart from the optical film 3 by a predetermined distance (=gap; see FIG. 4A); the objective lens 22 for converging the recording light L from a light source (not shown) such as a laser diode; and a beam splitter 23 for separating the recording light L into incident light toward the glass substrate 1 and reflected light from the glass substrate 1.

Figure 4A:
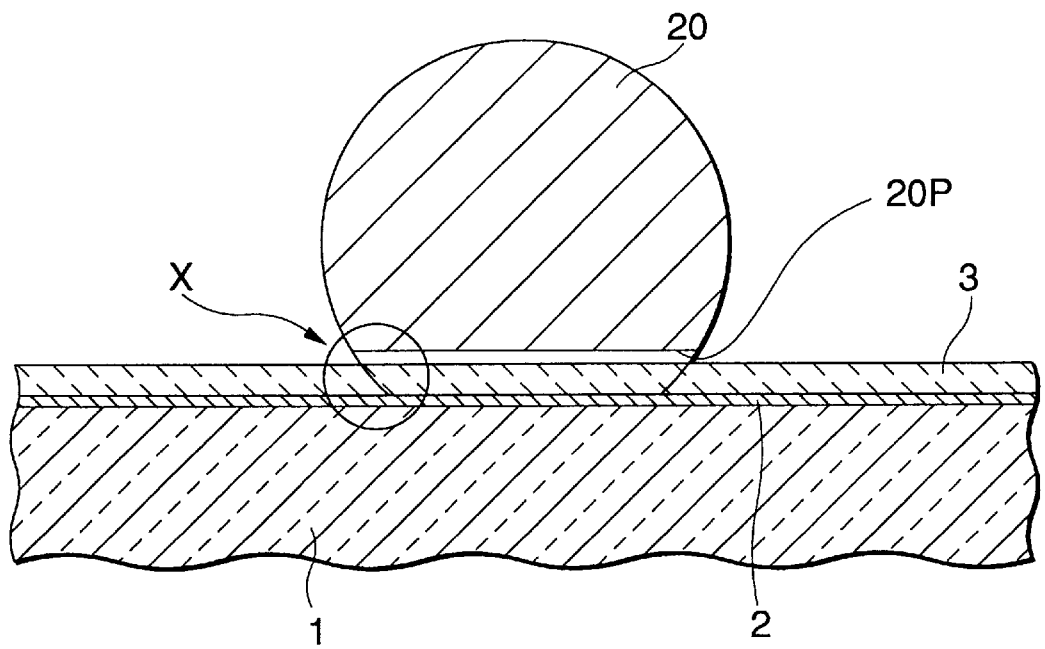
FIGS. 4A and 4B are detailed schematic diagrams illustrating an SIL and an optical film.
Figure 4B:
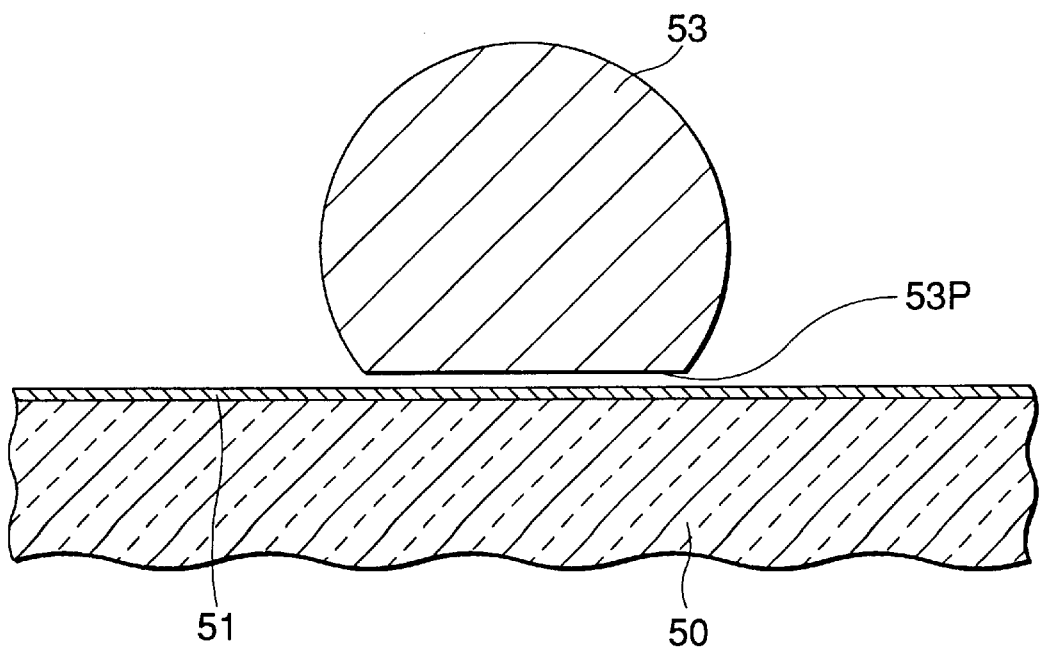

FIGS. 4A and 4B show detailed schematic diagrams illustrating the SIL 20 and the optical film 3.

As shown in a circle X of FIG. 4A, the SIL 20 has a shape in which a thickness portion equivalent to thickness of the optical film 3 is thinly cut away from an emergent surface 53P side of a conventional SIL 53 shown in FIG. 4B. The SIL 20 functions as the conventional SIL 53 in cooperation with the optical film 3 in a state in which the SIL 20 is spaced apart from the optical film 3 by a predetermined distance (=gap; see FIG. 4A).

Accordingly, the spot diameter of the recording light at an emergent surface 20P of the SIL 20 becomes smaller than the spot diameter of the recording light at the emergent surface 53P of the SIL 53, so that it is possible to alleviate the concentration of energy.

Next, a description will be given of the exposure step.

The drive motor 11 of the cutting apparatus 10 rotatively drives the glass substrate 1 together with the photoresist 2 and the optical film 3, and the disk feeding device 12 slowly drives the drive motor 11 in the radial direction of the glass substrate 1.

As a result, the floating head 21 causes the SIL 20 to float in such a manner as to be spaced apart from the optical film 3 by the predetermined distance (=gap).

Meanwhile, the recording signal $S_R$ is supplied to the recording head 13 from the external circuit (not shown), and the recording light L is turned on and off by an optical modulator (not shown).

Then, the recording head 13 introduces the recording light L to the objective lens 22 through the beam splitter 23 so as to focus the recording light L.

The focused recording light L is made incident upon the SIL 20, is further converged by the SIL 20 and the optical film 3, and is applied to the photoresist 2 on the glass substrate 1, thereby cutting (recording) information spirally.

Figure 5:
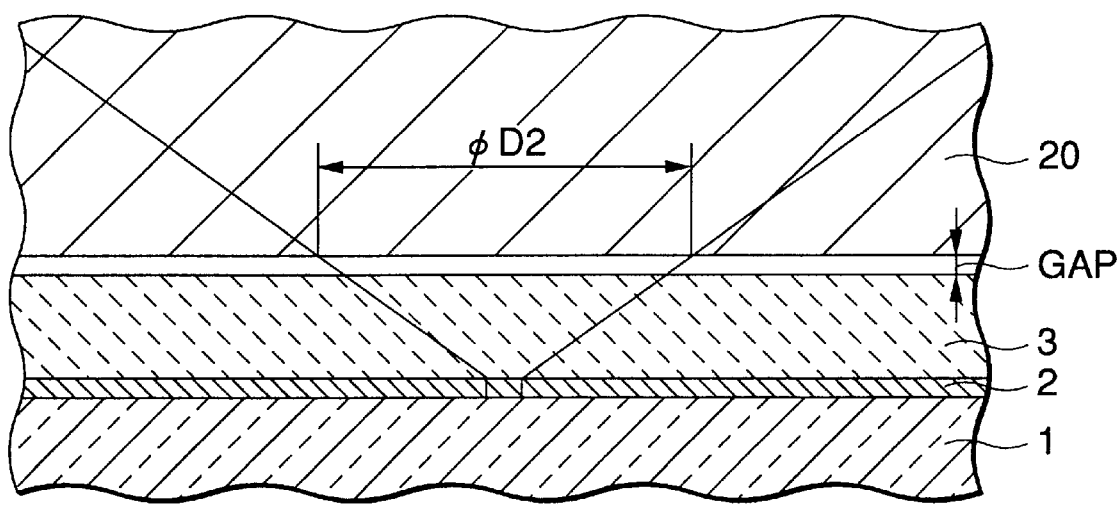
FIG. 5 is a detailed explanatory diagram of an exposure step.
Figure 6A:
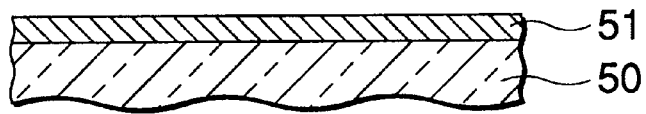
FIGS. 6A to 6C are process diagrams explaining essential portions of a conventional process for manufacturing a master optical disk.
Figure 6B:
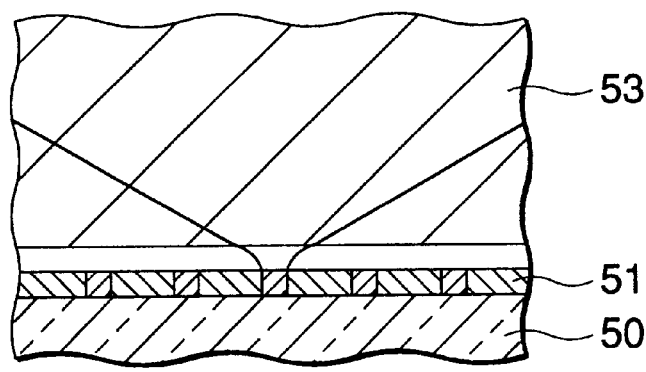
Figure 6C:
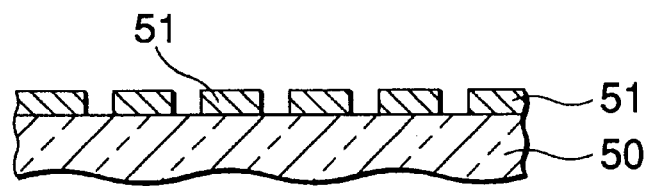
Figure 7:
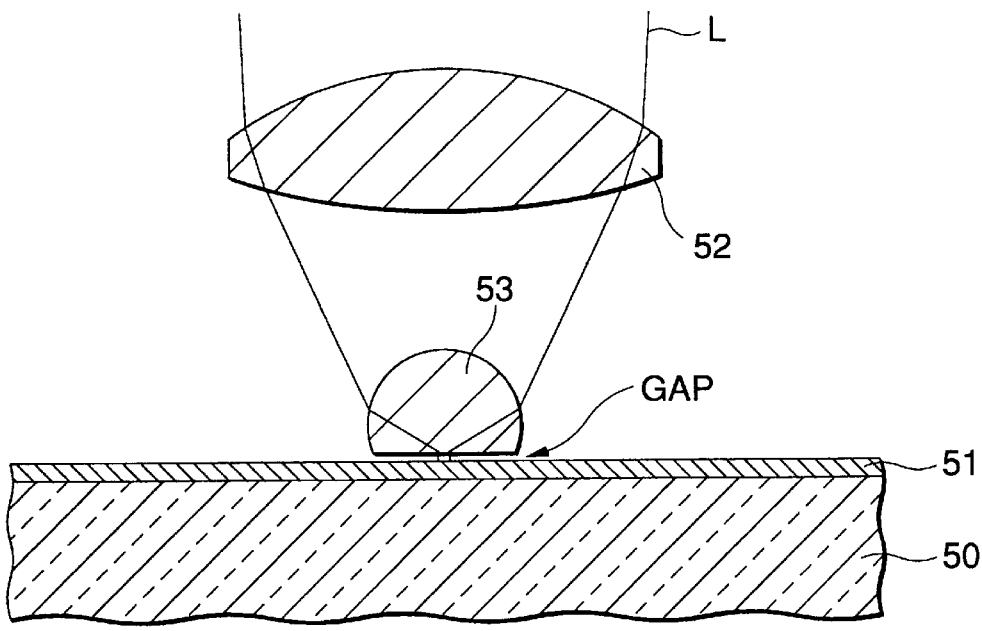
FIG. 7 is an explanatory diagram of a conventional optical system.
Figure 8:
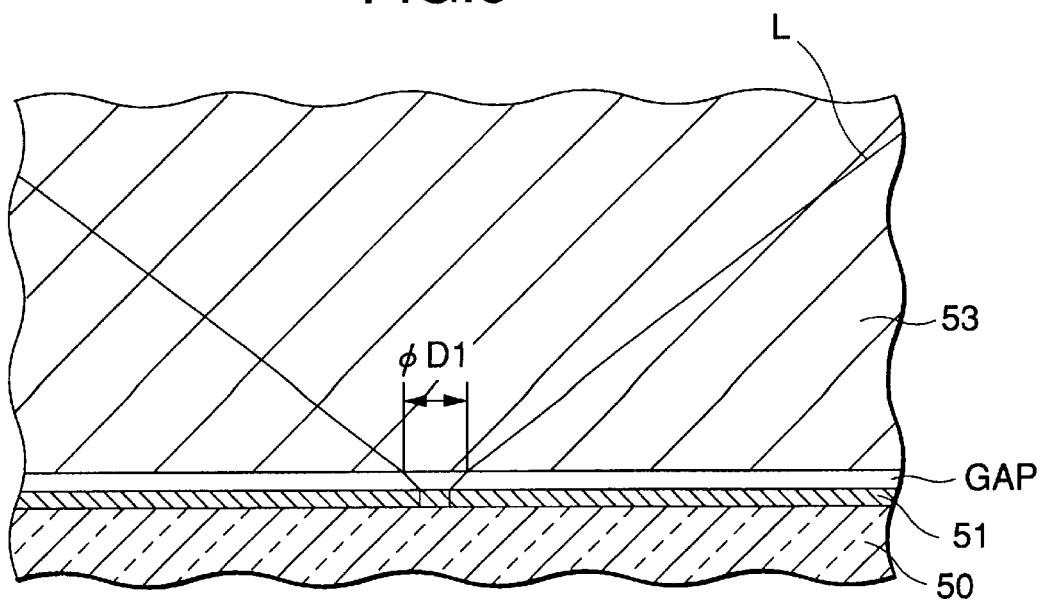
FIG. 8 is a detailed explanatory diagram of a conventional exposure step.

At this time, as shown in the detailed explanatory diagram in FIG. 5, if the beam diameter on the photoresist 2 is set identical to the conventional case, the beam diameter $\phi$ D2 at the emergent surface of the SIL 20 becomes large due to the presence of the optical film 3, and becomes $\phi D2 >> \phi D1$ Accordingly, as the SIL 20 and the optical film 3 cooperatively function as the SIL, the concentration of energy at the emergent surface 20P of the SIL 20 becomes smaller than the concentration of energy at the emergent surface 53P of the SIL 53 in the case were only the SIL is used as in the conventional case, thereby making it possible to prevent the deterioration of the SIL 20 such as clouding.

At the same time as this exposure, the recording head 13 separates the recording light L reflected by the glass substrate 1 by means of the beam splitter 23, and outputs the same to the head amplifier 14.

Consequently, the head amplifier 14 amplifies the focus servo signal $S_{FCS}$ and outputs the amplified signal to the focus matrix circuit 15 as the amplified focus servo signal $S_{AFCS}$.

On the basis of the amplified focus servo signal $S_{AFCS}$, the focus matrix circuit 15 generates the focus error signal $S_{FE}$, and outputs the same to the phase compensating circuit 16.

The phase compensating circuit 16 effects the phase compensation of the focus error signal $S_{FE}$, and outputs the phase-compensated focus error signal $S_{PFE}$ to the amplifier 17.

The amplifier 17 amplifies the phase-compensated focus error signal $S_{PFE}$ and outputs the amplified signal to the recording head 13 as the amplified phase-compensated focus error signal $S_{APFE}$.

As a result, the recording head 13 drives the objective lens 22 by an actuator (not shown) so as to effect focus control.

Figure 1D:
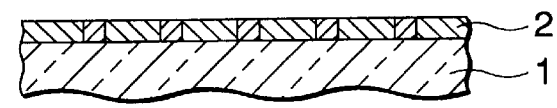

(5) Step of Removing the Optical Film (see FIG. 1D)

Next, washing is effected by using ultrapure water, and spin-drying is effected to remove the optical film 3.

Figure 1E:
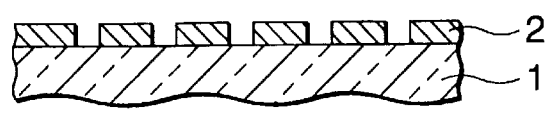

(6) Development Step (see FIG. 1E)

Then, development processing is effected, thereby forming a master glass disk on the surface of which recess-shaped pits are arranged spirally.

Subsequently, washing with ultrapure water and spin-drying is effected, and postbaking is effected to ensure removal of water and adhesion of the photoresist 2 to the glass substrate 1.

(7) Step of Making the Surface Conductive

Since the surface of the master glass disk is nonconductive, it is necessary to make the surface of the master glass disk conductive by forming a conductive film on the surface of the master glass disk so as to effect electroforming in the process of fabricating a stamper after the fabrication of the master glass disk.

As a technique for this purpose, it is possible to cite vapor deposition or sputtering (dryprocess) of a metal in a vacuum, electroless plating (wet process) thereof, or the like.

Nickel, silver, or the like is used as a conductive material for forming the conductive film.

(8) Step of Reproduction Inspection of the Master Disk

Since the conductive film used for establishing conductivity in the step of making the surface conductive also functions as a reflecting film, the reproduction inspection of the master glass disk can be effected by a master disk reproducing machine.

In the reproduction inspection, inspection of defects on the surface of the master glass disk and an confirmation of signal quality are carried out.

The master glass disk passed this master disk reproduction inspection is used in the stamper fabricating process which is performed subsequently.

In accordance with the above-described embodiment, the SIL can be disposed at a position spaced apart from the recording surface of the master glass disk by the portion of the thickness of the optical film as compared with the conventional SIL, and since the SIL functions as the SIL in cooperation with the optical film, the beam diameter at the recording-light emergent surface of the SIL can be enlarged (=$\phi$ D2). Hence, it is possible to alleviate the concentration of energy and prevent the deterioration (tarnish such as clouding) of the SIL.

Although a material which is non-soluble to water is used as the photoresist and a water-soluble material is used as the optical film, it is possible to use other materials insofar as the two materials do not mix and the exfoliation of the optical film is effected easily.

Furthermore, since the optical film is electrically conductive or has an antistatic effect, it is possible to reduce the attachment of dust to the disk substrate and prevent the occurrence of the unwritable time due to the fact that the floating head is sprung up by the dust attached to the optical disk substrate and the distance between the floating head and the optical disk substrate expands.

In addition, it is possible to prevent occurrence of the defects of the SIL by dust.

Further, it is possible to prevent occurrence of the defects of the protective film and the photoresist by dust.

Furthermore, although a description has been given of only the case where the glass substrate is used as the substrate of the optical disk, it is also possible to use a silicon substrate or an aluminum substrate provided with surface insulation.

The entire disclosure of each and every foreign patent application from which the benefit of foreign priority has been claimed in the present application is incorporated herein by reference, as if fully set forth.

While only certain embodiments of the invention have been specifically described herein, it will apparent that numerous modifications may be made thereto without departing from the spirit and scope of the invention.

[Effects of the Invention]

In accordance with a first aspect of the invention, in the optical-film coating step, the photoresist applied to the optical disk substrate is coated with the optical film for converging the recording light on the optical disk substrate in cooperation with the solid immersion lens body. In the exposure step, the photoresist is exposed through the optical film by using the optical system in a state in which the solid immersion lens body is held by the floating head. When the solid immersion lens body is made to float by the floating head, the solid immersion lens body can be spaced apart from the photoresist surface by the portion of the thickness of the optical film as compared with the case where the optical film is not provided. In addition, the beam diameter at the recording-light emergent surface of the solid immersion lens body can be enlarged. Hence, it is possible to alleviate the concentration of energy and prevent the deterioration of the solid immersion lens body.

Further, since the optical film is removed in the optical-film removing step after the exposure step, no influence is exerted on the subsequent steps of development, making the surface conductive, and reproduction inspection of the master disk.

In accordance with a second aspect of the invention, in addition to the effect derived from the first aspect of the invention, since the photoresist is non-soluble to water, and the optical film is water soluble, the two materials do not mix. Hence, in the washing step in the optical-film removing step, by merely washing the optical disk substrate having the photoresist and the optical filmcoated thereon with water, the optical film is removed easily, and no influence is exerted on the subsequent steps of development, making the surface conductive, and reproduction inspection of the master disk.

In accordance with a third aspect of the invention, in addition to the effect derived from the first aspect of the invention, since the optical film is formed of an electrically conductive material, it becomes difficult for dust to attach to the optical film due to static electricity.

In accordance with a forth aspect of the invention, in addition to the effect derived from the first aspect of the invention, since the optical film includes an electrically conductive material, it becomes possible to allow static electricity to escape, and reduce the attachment of dust due to static electricity.

In accordance with a fifth aspect of the invention, in addition to the effect derived from the first aspect of the invention, since the optical film includes an antistatic agent, it becomes possible to reduce the attachment of dust due to static electricity.

What is claimed is:

1. A method of manufacturing a master optical disk by using an optical system having a solid immersion lens so as to converge recording light on an optical disk substrate for cutting thereof, said method comprising the steps of:

coating an optical film on a photoresist applied to said optical disk substrate, wherein said optical film includes a thickness of a predetermined value so as to prevent a beam diameter converged at an emergent surface of said solid immersion lens from deteriorating said solid immersion lens, and converges the recording light on said optical disk substrate in cooperation with said solid immersion lens;

exposing said photoresist through said optical film by using said optical system; and removing said optical film, wherein said optical film includes an electrically conductive material.

2. The method of manufacturing a master optical disk according to claim 1, wherein said photoresist is non-soluble to water, and said optical film is water soluble, and wherein the optical-film removing step includes a washing step for washing said optical disk substrate having said photoresist and said optical film coated thereon with water.

3. The method of manufacturing a master optical disk according to claim 1, wherein said solid immersion lens is held by a floated head.

4. A method of manufacturing a master optical disk by using an optical system having a solid immersion lens so as to converge recording light on an optical disk substrate for cutting thereof, said method comprising the steps of:

coating an optical film on a photoresist applied to said optical disk substrate, wherein said optical film includes a thickness of a predetermined value so as to prevent a beam diameter converged at an emergent surface of said solid immersion lens from deteriorating said solid immersion lens, and converges the recording light on said optical disk substrate in cooperation with said solid immersion lens;

exposing said photoresist through said optical film by using said optical system; and removing said optical film, wherein said optical film includes an antistatic agent.

* * * * *